Patented May 15, 1945

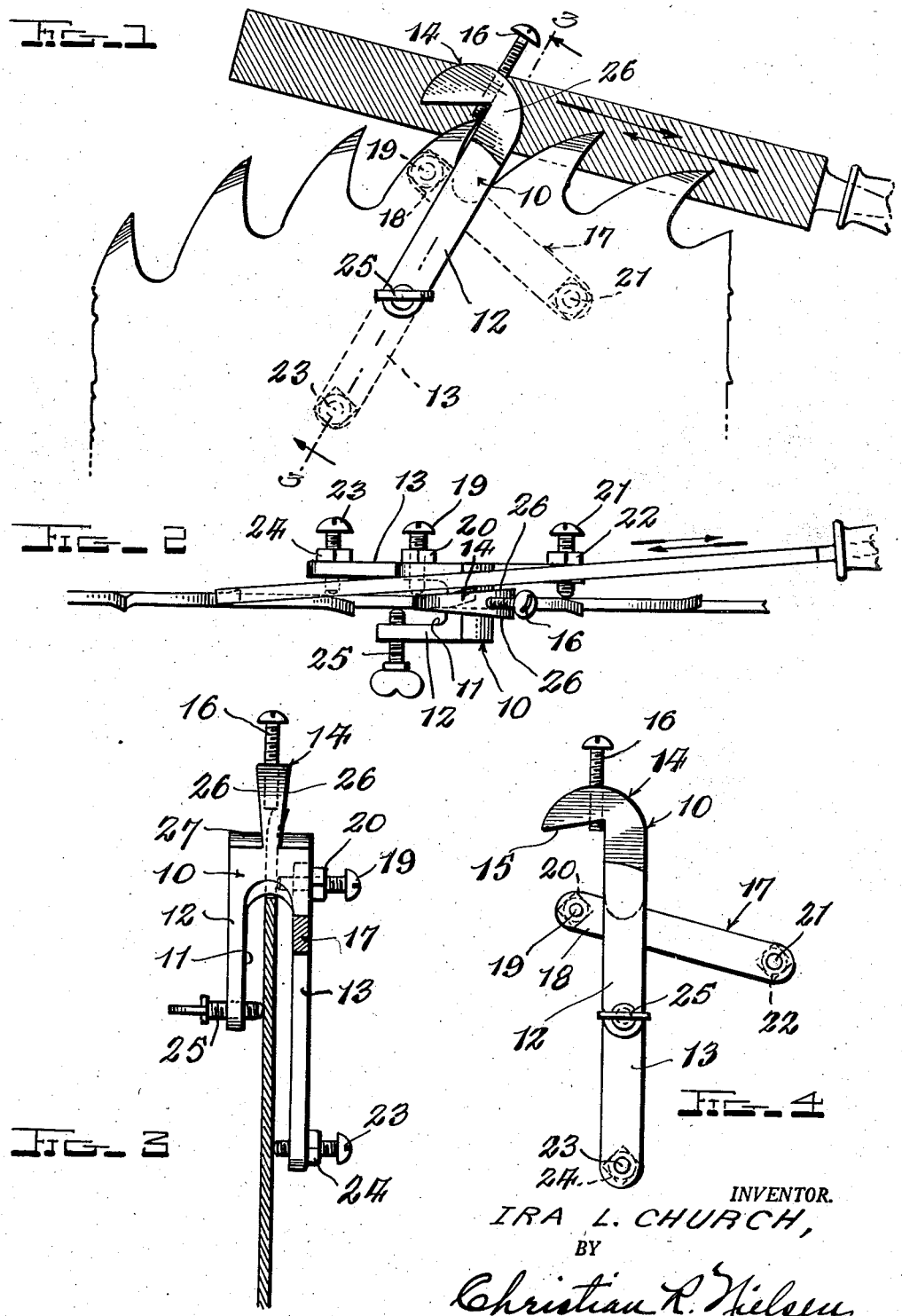

2,376,031

UNITED STATES PATENT OFFICE 2,376,031

SAW FILING GUIDE

Ira L. Church, Reed City, Mich.

Application November 25, 1943, Serial No. 511,693

2 Claims. (Cl. 76—47)

This invention relates to a saw filing guide and it consists in the constructions, arrangements and combinations herein described and claimed.

As is generally understood, after the teeth of a saw have been sharpened, the teeth must be set or swaged in order to give the proper angle to the teeth to effect the cutting action under operation of the saw. It is quite difficult to obtain a uniform twist or set of all teeth, and where certain of the teeth are improperly swaged, the result is that side portions of the teeth will lie outwardly, beyond the saw faces. Such teeth will tend to produce a binding action upon the saw under operation, thereby reducing the efficiency of the saw.

It is therefore the cardinal object of the invention to provide a guide device which may be readily installed upon a saw and having a body portion cooperative with teeth of the saw in a manner to enable uniform filing of the side faces of the teeth of the saw.

More particularly, it is an object of the invention to provide a guide device which may be quickly and readily adjusted to teeth of saws of varying heights, as well as novel centering and clamping means permitting the guide to be released for movement to the next tooth to be filed.

Additional objects, advantages and features of invention will be apparent from the following description and accompanying drawing, wherein, Figure 1 is a side elevation of the guide installed upon a circular saw blade, only a portion of the latter being shown.

Figure 2 is a top plan view thereof.

Figure 3 is a section on the line 3—3 of Figure 1.

Figure 4 is a side elevation of the guide.

There is illustrated a saw guide 10 consisting of an elongated body slotted medially as at 11, providing a pair of parallel legs 12 and 13, the latter being approximately twice the length of the former, for a purpose to be explained.

The upper portion of the body is formed with a hook-shaped guide head 14 of a thickness considerably less than that of the body, positioned medially thereof and as may be seen in Figures 2 and 3, the side walls of the head 14 are tapered inwardly in a downward direction, as well as tapering forwardly in the direction of the jaw 15 of the head. The jaw 15 is of flat formation, being inclined with respect to the legs 12 and 13 and at the juncture with the body a vertically extended threaded bore is formed for mounting of a height gauge bolt 16.

The body 10 has an arm 17 integrally formed therewith extending laterally from the leg 13 in opposite directions being flush with the inner face of the leg. The arm 17 projects beyond the leg 13 at one side, as at 18, and has a threaded opening for reception of an adjusting screw 19, the latter having a lock nut 20 for securing the screw in an adjusted position. The opposite end of the arm 17 projects a substantial distance from the leg 13 and has a set screw 21 mounted therein, the latter also having a lock nut 22 for securement of the screw 21 in an adjusted position. The relation of the arm 17 with respect to the leg 13 affords a stable support of the guide when mounted upon a saw blade.

Adjacent the lower end of the leg 13 a threaded opening is formed for mounting of a set screw 23, upon which a lock nut 24 is engaged and maintains the screw in adjusted positions. The set screws 19, 21 and 23 are mounted so as to traverse the slot 11 formed between the legs.

The leg 12 has a clamping screw 25 located adjacent its lower end, and since the leg is shorter than the leg 13, the set screw 25 will be located so as to contact a saw blade approximately at a point medially between the adjusting screws 19, 21 and 23, thus affording an even clamping action upon a blade interposed in the slot 11.

The tapered side walls 26 of the head terminate at arcuate shoulders 27 formed on the upper end of the body 10, and preferably the thickness of the head at the juncture with the body is approximately the same as the thickness of the saw blade and this is also true of the jaw 15. Thus the offset of the saw teeth if swaged too greatly will project beyond the faces 26, and this excess portion of the teeth may be readily removed by drawing a file thereacross, as indicated in Figures 1 and 2.

The guide is applied to a saw substantially as follows: The lock nuts 20, 22 and 24 are loosened and the screws 19, 21, and 23 are turned so as to clear the slot 11. The clamp screw 25 is also retracted so that a saw blade may enter the slot 11. With the saw blade engaged in the slot, the gauge screw 16 should rest directly upon the point of the tooth to be filed. The adjusting screw 19 should impinge the tooth adjacent the base thereof, as shown in Figure 1. The point of impingement by the adjusting screw 19 may be adjusted by means of the screw 16. The screws 19, 21 and 23 are now adjusted so as to contact the blade and maintain it in the medial position of the slot 11. The clamping screw 25 is now rotated so as to engage the opposite side of the saw. Final adjustment of the screws 19, 21 and 23 may be required for proper centering of the blade, after which the lock nuts 20, 22, and 24 may be tightened. With the guide thus engaged upon a saw blade, excess tooth portions extending beyond the faces 26 may be readily removed with a suitable file. When a tooth has been filed and it is desired to position the guide upon the next tooth, only the clamping screw 25 is loosened which will release the guide, and centering of the guide upon the saw will not be required.

While I have shown and described my guide specifically, this is by way of illustration only, and I consider as my own all such modifications in structure as fairly fall within the scope of the appended claims.

I claim:

1. A saw guide for filing the side faces of saw teeth comprising a body member having a pair of parallel spaced leg members forming a slot for reception of a saw blade, a head member on the body having a jaw adapted to overlie a tooth to be filed, set screw centering means on the body and one of said leg members, a clamp screw on the other leg member arranged in opposed relation to the set screw centering means for clamping a saw blade therebetween, an adjustable set screw on the head cooperable with the point of a saw tooth for positioning one of the set screw centering means with respect to the base of a tooth and said head having downwardly and forwardly inclined lateral faces forming a body thickness at the juncture of the body and head approximately the thickness of a saw tooth.

2. A saw guide for filing the side faces of saw teeth comprising a body member having a pair of parallel spaced leg members forming a slot for reception of a saw blade therebetween, one of said legs being of a length greater than the other, a head on the body having a jaw constructed to overlie a saw tooth, an arm on the long leg disposed at an angle thereto and projecting upon opposite sides thereof, one terminal end of the arm being positioned between the jaw and the other end terminating a substantial distance laterally beyond the leg, an adjustable set screw adjacent each terminal end of the arm, an adjustable set screw adjacent the lower end of the long leg, a clamp screw on the short leg positioned substantially at a point medially of the positions occupied by said adjusting screws on the arm and leg, an adjusting screw on the head cooperative with the point of a saw tooth for adjusting one of the set screws on the arm with respect to the base of a tooth to be filed, and said head having downwardly and forwardly inclined faces forming a body thickness at the juncture of the body and head approximately the thickness of a saw tooth.

IRA L. CHURCH.